US012686170B2

(12) United States Patent (10) Patent No.: US 12,686,170 B2

Koroly (45) Date of Patent: Jul. 21, 2026

(54) ADVANCED MANUFACTURING OPERATIONAL APPARATUS, SYSTEM, AND METHOD

(71) Applicant: The United States of America as represented by the Secretary of the Navy, Arlington, VA (US)

(72) Inventor: Spencer Dominic Koroly, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 81 days.

(21) Appl. No.: 18/926,770

(22) Filed: Oct. 25, 2024

(65) Prior Publication Data

US 2026/0077554 A1 Mar. 19, 2026

Related U.S. Application Data

(60) Provisional application No. 63/694,754, filed on Sep. 13, 2024.

(51) Int. Cl.
B29C 64/25 (2017.01)
B29C 64/232 (2017.01)
(Continued)

(52) U.S. Cl.
CPC ............ B29C 64/25 (2017.08); B29C 64/232 (2017.08); B29C 64/236 (2017.08);
(Continued)

(58) Field of Classification Search
None
See application file for complete search history.

(56) References Cited

U.S. PATENT DOCUMENTS

2019/0168455 A1* 6/2019 Besim ................... B29C 64/118
2020/0147882 A1* 5/2020 Nadeau ................. B29C 64/321
(Continued)

FOREIGN PATENT DOCUMENTS

EP 3774341 A1 * 2/2021 .............. B22F 15/20

OTHER PUBLICATIONS

Rivera, L. (Sep. 14, 2023). U.S. Marines make history by 3D printing in the Air. GovDesignHub. https://govdesignhub.com/2023/09/14/u-s-marines-make-history-by-3d-printing-in-the-air/.
(Continued)

*Primary Examiner* — Jacob T Minskey
*Assistant Examiner* — Adrien J Bernard
(74) *Attorney, Agent, or Firm* — Naval Information Warfare Center Pacific; Evan Hastings; Kyle Eppele

(57) ABSTRACT

An advanced manufacturing operational apparatus, system, and method. In some embodiments, a three-dimensional printer, comprising an outer enclosure; and a print chamber within the outer enclosure, further comprising: a spool mount fixed proximally to a bottom of the print chamber and a rear of the print chamber, a compact toolhead coupled to a linear rail, and further comprising an extruder motor, a filament applicator, and a linear motor, wherein the linear motor is mounted towards the rear of the print chamber and may be selectively positioned above the spool mount, a linear drive system abutting the outer enclosure along at least one axis, a frame structure comprising a rigid base plate coupled to a vertical pulley system, a controller, and a non-transitory storage medium capable of storing machine-readable instructions executable to cause the controller to: utilize the filament applicator to dispense a build material.

9 Claims, 10 Drawing Sheets

(51) Int. Cl.

| | |
|---|---|
| *B29C 64/236* | (2017.01) |
| *B29C 64/307* | (2017.01) |
| *B29C 64/364* | (2017.01) |
| *B33Y 10/00* | (2015.01) |
| *B33Y 30/00* | (2015.01) |
| *B29C 64/118* | (2017.01) |

(52) U.S. Cl.
    CPC .......... *B29C 64/307* (2017.08); *B29C 64/364*
        (2017.08); *B33Y 10/00* (2014.12); *B33Y 30/00*
            (2014.12); *B29C 64/118* (2017.08)

(56) References Cited

U.S. PATENT DOCUMENTS

| | | | | |
|---|---|---|---|---|
| 2021/0244067 A1* | 8/2021 | Malshe | ................... | B22F 12/53 |
| 2022/0410469 A1* | 12/2022 | Rezai | ................... | B29C 64/118 |
| 2023/0321908 A1 | 10/2023 | Shnell et al. | | |
| 2024/0009927 A1* | 1/2024 | Floor | ................... | B29C 64/209 |

OTHER PUBLICATIONS

Rivera, L. (Sep. 20, 2023). U.S. Marine Corps proves what's possible by 3D printing in Flight. GovDesignHub. https://govdesignhub. com/2023/09/20/u-s-marine-corps-proves-whats-possible-by-3d-printing-in-flight/.
Camre helps Marines take 3D printing to New Heights. Naval Postgraduate School. (Jul. 5, 2023). https://nps.edu/-/camre-helps-marines-take-3d-printing-to-new-heights#:~:text=The%20Consortium% 20for%20Additive%20Manufacturing,June%2021%20in% 20Southern%20California.

\* cited by examiner

AM System
100

Outer enclosure
120

Server
rack slide
102

Print
chamber
door
101

Pulley
System
140

Pulley belt
141

Tensioner
142

Filament
spool
150

Server rack
200

Outer
enclosure
120

Print
chamber
110

90

| Model | Build Volume (mm) | | | Printer Size (mm) | | | Build Volume (cm^3) | Printer Volume (cm^3) | Volume Efficiency |
|---|---|---|---|---|---|---|---|---|---|
| | X | Y | Z | Width | Depth | Height | | | |
| 1 | 500 | 500 | 420 | 618 | 710 | 738 | 105000 | 323819.64 | 32% |
| 2 | 300 | 300 | 220 | 418 | 510 | 538 | 19800 | 114690.84 | 17% |
| 3 | 200 | 200 | 120 | 318 | 410 | 438 | 4800 | 57106.44 | 8% |

Fig. 9

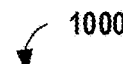

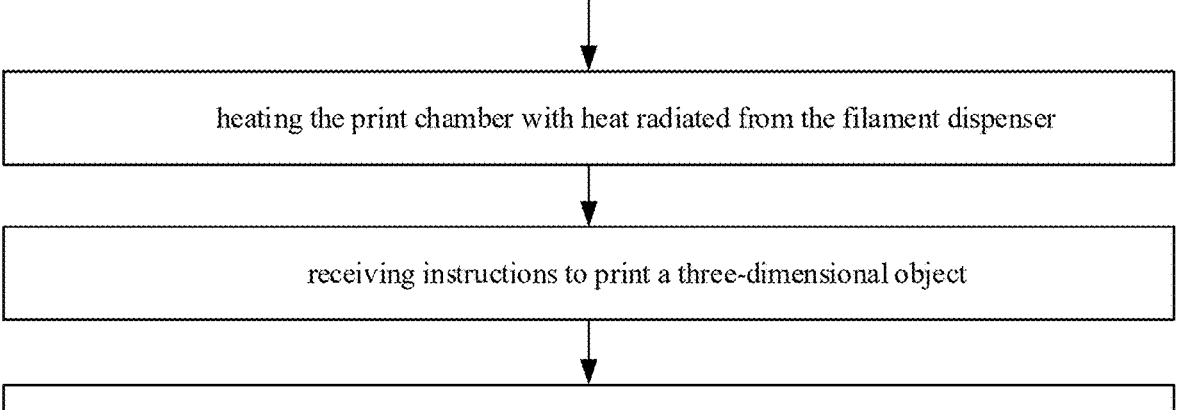

providing an enclosed additive manufacturing system comprising an outer enclosure; and a print chamber within the outer enclosure, further comprising a spool mount fixed proximally to a bottom of the print chamber and a rear of the print chamber, a compact toolhead coupled to a linear rail, and further comprising an extruder motor, a filament applicator, and a linear motor, wherein the linear motor is mounted towards the rear of the print chamber and may be selectively positioned above the spool mount, a linear drive system abutting the outer enclosure along at least one axis, a frame structure comprising a rigid base plate coupled to a vertical pulley system, a controller, a non-transitory storage medium capable of storing machine-readable instructions executable to cause the controller to utilize the filament applicator to dispense a build material heating the print chamber with heat radiated from the filament dispenser receiving instructions to print a three-dimensional object printing the three-dimensional object within the print chamber of the enclosed additive manufacturing system

Fig. 10

ADVANCED MANUFACTURING OPERATIONAL APPARATUS, SYSTEM, AND METHOD

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: NIWC_Pacific_T2@us.navy.mil navy.mil, referencing Navy Case No. 212,289.

TECHNICAL USE

Aspects of the present disclosure pertains generally to additive manufacturing apparatuses, systems and methods, and including but not exclusively three-dimensional printers.

BACKGROUND

Additive manufacturing (AM) refers to processes and techniques for creating objects by systematically "adding" material. Unlike subtractive manufacturing techniques, which remove material from a larger block, AM enables the efficient production of complex geometries with minimal waste. AM may encompass complex industrial manufacturing processes including computer-aided modeling, material traceability, process flow, quality and inspection systems, building validation, electron-beam manufacturing, selective laser melting, and three-dimensional printing.

Three-dimensional (3D) printers create three-dimensional objects by depositing material layer by layer, based on a digital model. Common types of 3D printing techniques include Fused Deposition Modeling (FDM), Fused Filament Fabrication (FFF), Sterolithography (SLA), and Selective Laser Sintering (SLS). Furthermore, these approaches typically use 3D printers commonly utilize plastics, resins, or metals for filament material. Specifically, FDM uses thermoplastic filaments, SLA utilizes UV light to cure resin, and SLS fuses powdered materials with lasers. 3D printers are widely used in industries such as manufacturing, healthcare, and aerospace for prototyping, custom parts, and even medical implants, offering a versatile and cost-effective approach to production. The technology has also gained popularity among hobbyists for creating projects and rapid prototyping.

3D printing and additive manufacturing developed rapidly to fill expanding niches. One such innovation is the enclosed printer design. Enclosed 3D printers offer several benefits in terms of performance, safety and material versatility. An enclosed print chamber helps maintain a stable internal chamber, which is critical to prevent warping of certain print materials. Another advancement has been towards performance, enabling rapid production of 3D printable objects. High performance printers may operate at speeds of 250-500 mm/s and are ideal for printing expendable objects or rapid prototyping. While these improvements have supplied certain advantages, needs for further use cases have also expanded. In particular, there is a need for spatially efficient printers that also deliver high performance and durability.

SUMMARY

According to illustrative embodiments, an enclosed three-dimensional printer, comprising: an outer enclosure; and a print chamber within the outer enclosure, further comprising: a spool mount fixed proximally to a bottom of the print chamber and a rear of the print chamber, a compact toolhead coupled to a linear rail, and further comprising an extruder motor, a filament applicator, and a linear motor, wherein the linear motor is mounted towards the rear of the print chamber and may be selectively positioned above the spool mount, a linear drive system abutting the outer enclosure along at least one axis, a frame structure comprising a rigid base plate coupled to a vertical pulley system, a controller, and a non-transitory storage medium capable of storing machine-readable instructions executable to cause the controller to: utilize the filament applicator to dispense a build material.

In some embodiments, a method of additive manufacturing, the steps comprising: providing an enclosed additive manufacturing system comprising an outer enclosure; and a print chamber within the outer enclosure, further comprising a spool mount fixed proximally to a bottom of the print chamber and a rear of the print chamber, a compact toolhead coupled to a linear rail, and further comprising an extruder motor, a filament applicator, and a linear motor, wherein the linear motor is mounted towards the rear of the print chamber and may be selectively positioned above the spool mount, a linear drive system abutting the outer enclosure along at least one axis, a frame structure comprising a rigid base plate coupled to a vertical pulley system, a controller, and a non-transitory storage medium capable of storing machine-readable instructions executable to cause the controller to utilize the filament applicator to dispense a build material; heating the print chamber with heat radiated from the filament dispenser; receiving instructions to build a three-dimensional object; and printing the three-dimensional object within the print chamber of the enclosed additive manufacturing system.

In some embodiments, a rack mountable additive manufacturing system, comprising: an outer enclosure capable of mounting to a server rack; a print chamber within the outer enclosure designed to maximize volumetric efficiency, further comprising: a spool mount fixed proximally to a bottom of the print chamber and a rear of the print chamber, a compact toolhead coupled to a linear rail, and further comprising an extruder motor, a filament applicator, and a linear motor, wherein the linear motor is mounted towards the rear of the print chamber and may be selectively positioned above the spool mount, a linear drive system abutting the outer enclosure along at least one axis, a frame structure comprising a rigid base plate coupled to a vertical pulley system, a controller, and a non-transitory storage medium capable of storing machine-readable instructions executable to cause the controller to utilize the filament applicator to dispense a build material.

It is an object to provide an Advanced Manufacturing Operational Apparatus, System, and Method that offers numerous benefits, including a compact, rapid, and volumetrically efficient.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings:

FIG. 9 shows a table comprising three embodiments of 3D printers and displays a comparison of their corresponding volumetric efficiency.

FIG. 10 shows a block-diagram flowchart of a method of three-dimensional printing using an additive manufacturing system.

DETAILED DESCRIPTION OF EMBODIMENTS

Figure 1:
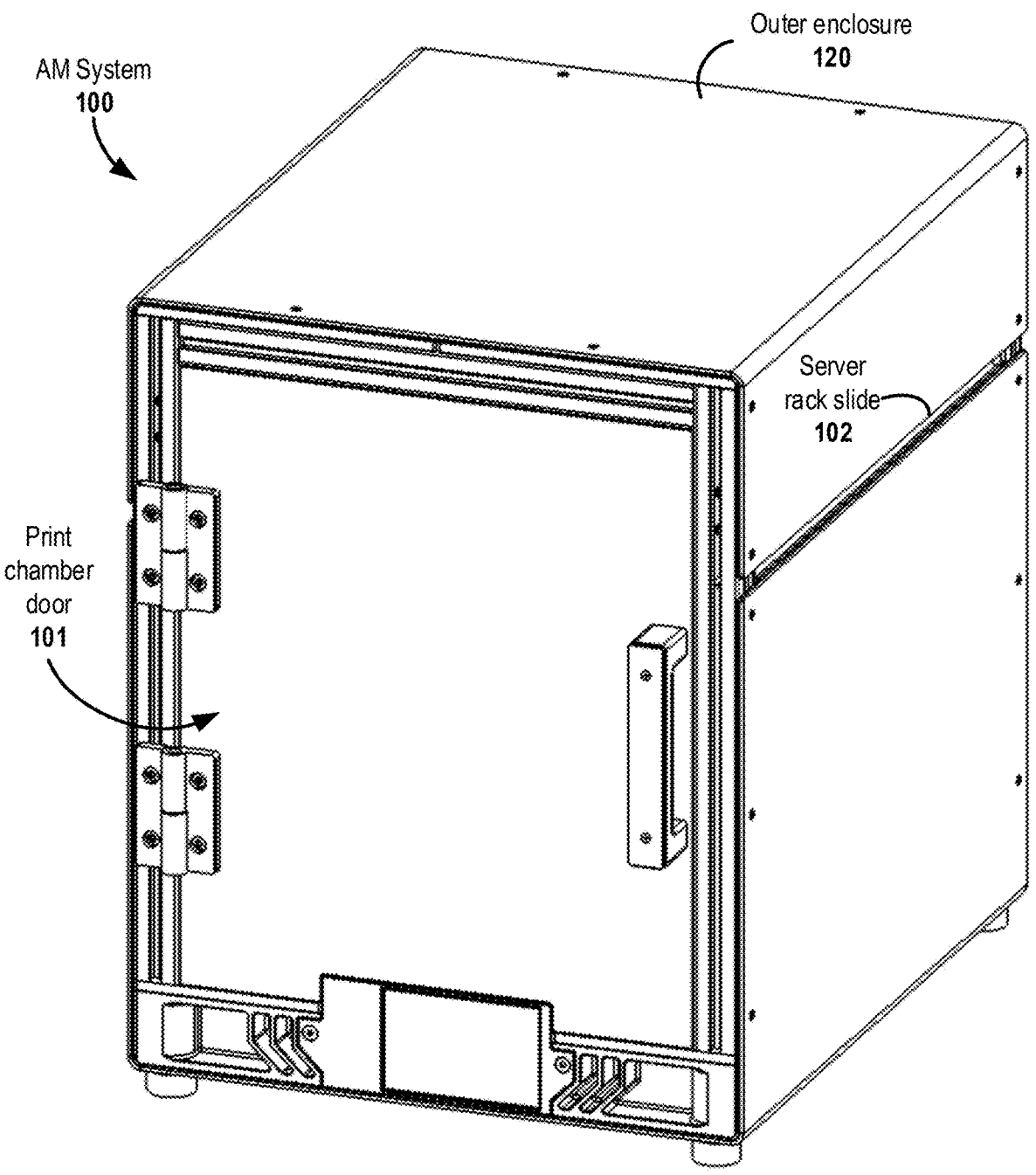
FIG. 1 shows an exemplary illustration of an external view of an enclosed additive manufacturing system.

The disclosed apparatus, system, and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other apparatus, system, and methods described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Additive Manufacturing ("AM") comprises a wide set of complex industrial manufacturing processes and techniques including, but not limited to, computer-aided modeling, material traceability, process flow, quality & inspection systems, building validation, and three-dimensional printing. An Advanced Manufacturing Operational Apparatus, System, and Method ("AMOS") may be an AM apparatus, system, or method and, in some embodiments, a three-dimensional printer apparatus, system, and/or method.

Three-dimensional printers have been widely adopted from the manufacturing and defenses sectors to medical implants and hobbyist prototyping. Such adoption has called for many sizes, specialized print materials, and unique component arrangements to meet the diverse needs. An unsolved need is for a 3D printer specifically design to optimize print volume in spatially constrained environments. For example, an oceanic vessel has many uses for a 3D printer, but could require that a ruggedized 3D printer fits within a server rack. The imputed requirements for this example would be a need portability, ruggedization, and a compact design with tight printing tolerances. While experimenting with existing printers, inventors discovered a need for additional performance and volumetric efficiency. An AMOS may address these concerns as described below.

In some embodiments, the AMOS is an advanced manufacturing device designed to produce polymer components through a Method Fused Deposition modeling ("FDM"), also known as Fused Filament Fabrication ("FFF"). Unique features and complex design elements enable it to meet needs for high performance in spatially constrained environments.

FIG. 1 shows an exemplary illustration of an external view of an enclosed additive manufacturing system comprising, consisting of, or consisting essentially of an outer enclosure 120, print chamber door 101 in a closed configuration, and a server rack slide 102. Additive manufacturing systems, including 3D printers, can generally be grouped into categories of open or enclosed regarding their outer structure. Enclosed 3D printers offer several benefits including a protected printer chamber, easily transportable, an increased array of print filament options due to the thermally confined print chamber. The outer enclosure 120 provides an outer structure for the enclosed 3D printer and contains the print chamber 110. In a preferred embodiment, the outer enclosure is rectangular prism with a built-in print chamber door 101 on one side. The rectangular prism embodiments of the outer enclosure 120 may comprise a top side, bottom side, and four lateral sides comprising a front side and a rear side. In some embodiments, the outer enclosure 120 may be a ruggedized case or fit inside a ruggedized case. In one embodiment, the ruggedized case may be a pelican case.

Furthermore, enclosed three-dimensional printers may have built-in functionality to integrate with external systems. For example, the outer enclosure 120 may comprise server rack slides 102 to mount the device/system into a server rack 200. Furthermore, the outer enclosure 120 may be designed to fit tightly within a commercial-off-the-shelf server rack. In some embodiment, the server rack 200 may support one, or a plurality of AMOS devices that may be optionally networked into a 3D printer farm.

Figure 2:
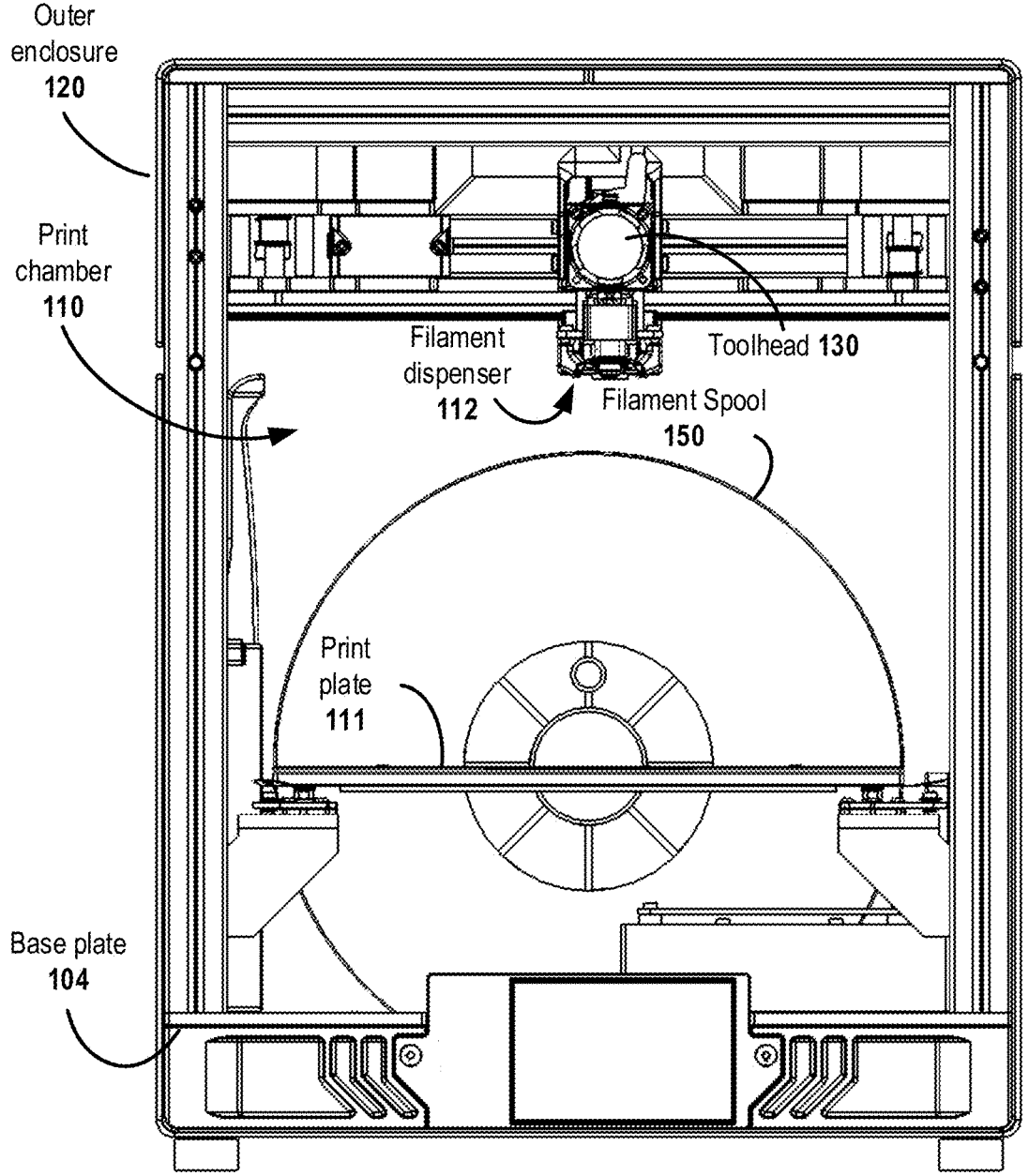
FIG. 2 shows an exemplary illustration of an internal view of an additive manufacturing system's print chamber.

FIG. 2 shows an exemplary illustration of an internal view of an additive manufacturing system comprising, consisting of, or consisting essentially of a print chamber 110, print plate 111, base plate 104, filament dispenser 112, filament spool 150, and a tool head 130. The print chamber 110 is defined by the outer enclosure and may be designed to maximize volumetric efficiency of the additive manufacturing system. In one embodiment, wherein the outer enclosure 120 is a rectangular prism, the print chamber 110 is defined by a top side, bottom side, and four lateral sides comprising a front side and a rear side. The bottom of the print chamber 110 is the area adjacent to the bottom side. The rear of the print chamber 110 is the area adjacent to the rear side. The filament spool 150 may be arranged proximal to the bottom and to the rear of the print chamber 110. Such position poses several benefits including creating a low center of gravity for the device and ease of access.

The print plate 111 serves a platform on which the filament dispenser 112 may dispense a build material. Also, the print plate 111 has an area at least large as the base of the build volume and defines the maximum dimensions for the printable object. Materials for the print plate 111 may vary based on the use case and the build material. Additionally, the height that the print plate 111 is set at along the Y-axis plate relates to the build volume. This allows the volumetric efficiency to be maximized with Y-position in combination with other design elements. In one embodiment, the width of the enclosed additive manufacturing system is approximate 16 ¼ inches and wherein the print plate is approximately 12 inches deep by 12 inches wide.

A filament spool 150 for an AMOS may comprise a cylindrical core, typically made of plastic or cardboard, around which a continuous length of thermoplastic filament is tightly would. The spool 150 may have side flanges that prevent the filament from unspooling or tangling. It typically has a central hole to fit onto a spool folder, allowing it to rotate freely as the filament is fed into the printer. Alternatively, the flange of the filament spool may rest upon filament rollers 151 the freely rotate and enable rotation of the filament spool 150.

Many types of filament materials may be used for additive manufacturing, including 3D printing, by an Advanced Manufacturing Operational Apparatus, System, and/or Method. Common filament materials include Polylactic Acid, Polyethylene Terephthalate, Acrylonitrile Butadiene Styrene (ABS), Acrylonitrile Styrene Acrylate (ASA), Thermoplastic Polyurethane, ONYX® composite filament, and Nylon. Furthermore, specialty filament materials may include carbon fiber reinforced wood filament, metal-filled filaments, glow-in-the-dark filaments, conductive filaments, Polyvinyl Alcohol, and polycarbonate. The unloading temperature for these filaments typically ranges from 200-260° C. For some filaments, an enclosed three-dimensional printer is recommended, such as ABS, ASA, and Polycarbonate. The enclosed design of the Advanced Manufacturing Operational Apparatus, System, and Method enables construction with many filament types. While the disclosed materials show various embodiments, the possible filaments are not limited to those described.

Additionally, the position of the spool may enable an auto-drying functionality. Sometimes, a filament spool 150 may become wet from environmental conditions, user error, or other causes. Typical three-dimensional printers are unable to use wet material. Here, wet spools may be placed inside of an enclosed additive manufacturing system 100 and dried automatically. The filament material may be dried automatically in the sense that the drying need not be initiated by the AM's operator. Drying the filament materials may be enabled by the heat radiated by the filament dispenser as the enclosed print chamber offers enables thermal capture. In an additional or alternative embodiment, moisture may be removed with a humidity control device 151. As one example, the humidity control device may be a desiccant.

Another advantage of locating the filament spool 150 inside the print chamber 110 is that the filament may be pre-heated by the thermal insulation effect of the closed print chamber. The print chamber 110 does not need to be heated for general functionality. Heating may add capabilities including the printing of some filament materials and for benefits including efficiency. For additive manufacturing systems including 3D printers that situate the filament outside of the machine, the filament material temperature is about 20 degrees Celsius (C). To print, the print material is heated up to approximately 230 C. When the filament spool 150 is inside the machine, the need to heat up the temperature is decreased because the print chamber has a higher ambient temperature while operating. Pre-heating the material prior to the extrusion process also improves filament flow rates as the extrusion system has to provide less heat into the material to initiate the glass transition process. In some embodiments, the chamber may be a temperature around 60 C, approximately pre-heating the material to 40 C, as an example. This illustrative example shows the benefits of the filament spool's 150 placement inside the print chamber 110.

FIG. 2 further shows a drawing of an exemplary embodiment of a compact toolhead 130 coupled to and able to slide along a linear rail, wherein the toolhead 130 further comprises, consists of, or consists essentially of an extruder motor, a filament applicator, and a linear motor, wherein the linear motor is mounted towards the rear of the print chamber and may be selectively positioned above the filament spool 150. Towards the rear of the print chamber 110 may comprise the linear motor be arrange in direction near or nearest the rear of the print chamber 110 relative to the center of mass of the toolhead 130. The positioning of each of these elements may be specifically designed to optimize the volumetric efficiency of the build volume.

Volumetric efficiency may be determined by the comparison of the maximum size of a printable object versus the total volume of the printer. It is worth noting that this total printer volume includes the filament spool 150, which is often located outside of a print chamber. In some embodiments, the linear drive system may be adjacent to abutting the outer enclosure 120 along at least one axis. In other words, the linear drive system may be arranged tightly to the outer enclose to maximize the print volume space. For example, linear drive system may comprise three axes of toolhead 130 translation ("X", "Y", and "Z"), wherein at least one of these axes is abutting or arranged tightly to the outer enclosure as shown in FIG. 2. In some embodiments, the linear drive system may partially or completely fill a cavity in the outer enclosure 120.

Additionally, the AMOS may comprise a frame structure comprising a rigid base plate 104 coupled to the vertical drive system. In some embodiments, the vertical drive system may correspond to motion or translation of the toolhead 130 along the Y-axis. Additive manufacturing systems and apparatuses typically comprise drive system to move the filament dispense in X, Y, and Z directions. A common structure for a drive system is to have a frame structure internal to the AM device made of twelve beams, forming a rectangular prism structure, to support the drive systems. In the AMOS, a rigid base plate may be used in place of the lower form beams to maximize space, as shown in FIG. 2. The base plate 104 may support the system with a minimal volumetric profile.

Figure 3:
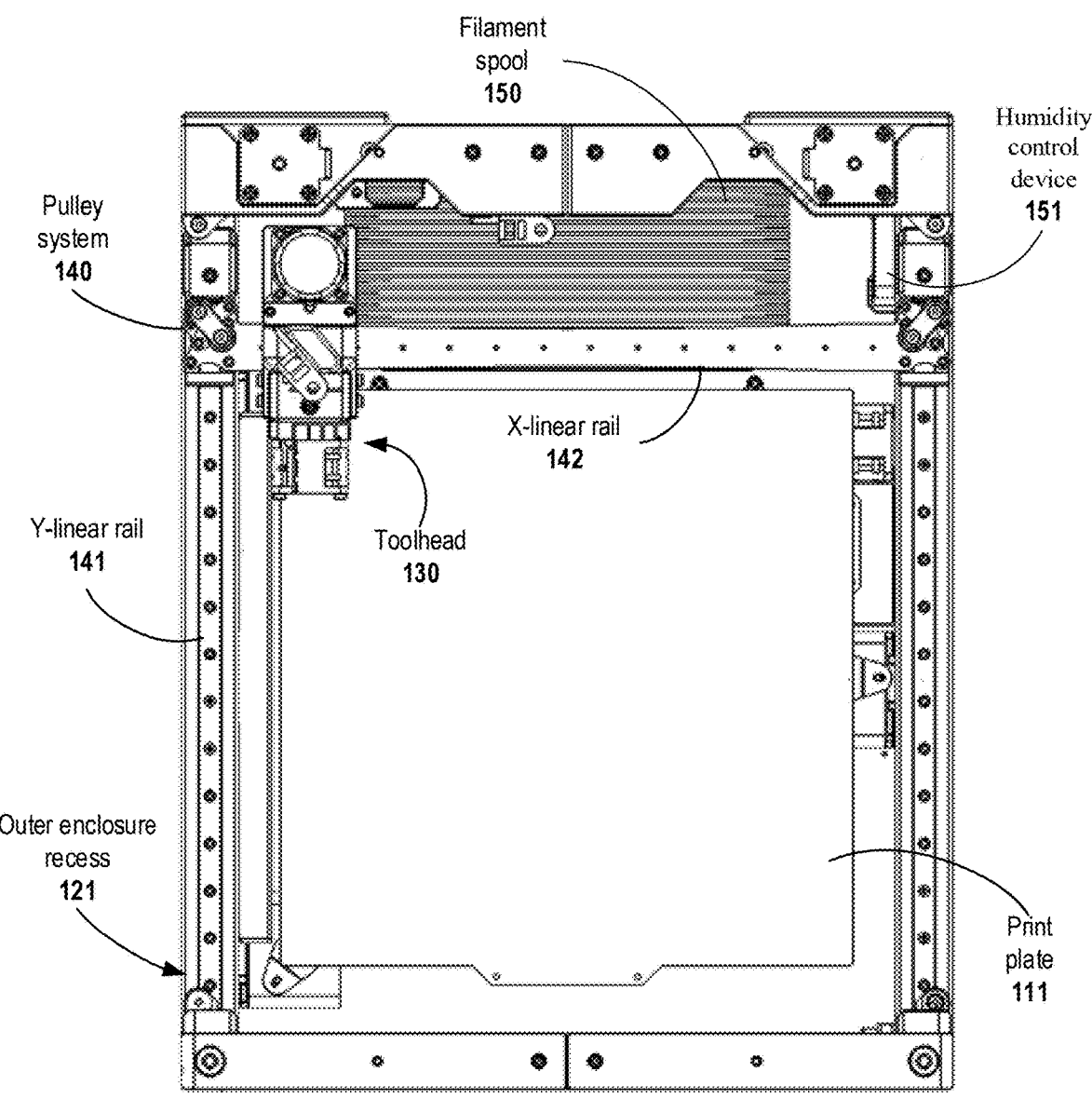
FIG. 3 shows an exemplary illustration of a top-view of an additive manufacturing system.

FIG. 3 shows an exemplary illustration of a top-view of an additive manufacturing system comprising, consisting of, or consisting essentially of a print plate 111, outer enclosure recess 121, toolhead 130, linear drive system 140, Y-linear rail 141, X-linear rail 142, filament spool 150, and humidity control device 151. An outer enclosure recess 121 may be an extruded cavity on the internal side(s) of the outer enclosure 120. This cavity may allow the linear drive system 140 and rails to be arranged at the maximum possible width. The cavity allows for this space maximization while maintaining the structural integrity of the outer enclosure.

In some embodiments, the AMOS may further comprise a humidity control device. A humidity control device 151 may be integrated into the print chamber 110 to reduce humidity. The source of humidity may be a wet filament spool, which may be wet for a variety of environmental. This device may be proximally located near the filament spool 150 within the print chamber. In one embodiment the humidity control device may be adjacent the filament spool for absorbing moisture. As an example, the humidity control device may be a desiccant. Other examples of humidity control devices include, but are not limited to dehumidifiers, silica gels, and moisture absorbers (calcium chloride crystals).

Furthermore, the AMOS may comprise a controller and a non-transitory storage medium capable of storing machine-readable instructions executable to cause the controller to utilize the filament applicator to dispense a build material.

In some embodiments, the AMOS may comprise a computing device. The computing device typically includes a variety of non-transitory computer readable media. By way of example, and not limitation, computer readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device. Computer storage media does not, however, include propagated signals. Rather, computer storage media excludes propagated signals. Any such computer storage media may be part of computing device.

In some embodiments, the AMOS may comprise a memory. Memory includes computer storage media in the form of volatile and/or nonvolatile memory. The memory may be removable, non-removable, or a combination thereof. Examples of hardware devices include solid-state memory, hard drives, optical-disc drives, etc. Processors read data from various entities such as memory or I/O components. Memory stores, among other data, one or more applications. The applications, when executed by the one or more processors, operate to perform functionality on the computing device. The applications may communicate with counterpart applications or services such as web services accessible via a network (not shown). For example, the applications may represent downloaded client-side applications that correspond to server-side services executing in a cloud. In some examples, aspects of the disclosure may distribute an application across a computing system, with server-side services executing in a cloud based on input and/or interaction received at client-side instances of the application. In other examples, application instances may be configured to communicate with data sources and other computing resources in a cloud during runtime, such as communicating with a cluster manager or health manager during a monitored upgrade or may share and/or aggregate data between client-side services and cloud services.

In some embodiments, the AMOS may comprise presentation components. Presentation components present data indications to a participant or other device. Examples of presentation components include a display device, speaker, printing component, vibrating component, etc. I/O ports allow computing device to be logically coupled to other devices including I/O components of which may be a user interface. Illustrative components include a touchscreen interface, microphone, joystick, game pad, satellite dish, scanner, printer, wireless device, etc.

In some embodiments, the AMOS may comprise a control system configured to manage additive manufacturing operations and processes. The control system may comprise a user interface via presentation components and provide user control over device diagnostics, print status, maintenance, errors, and more.

Figure 4:
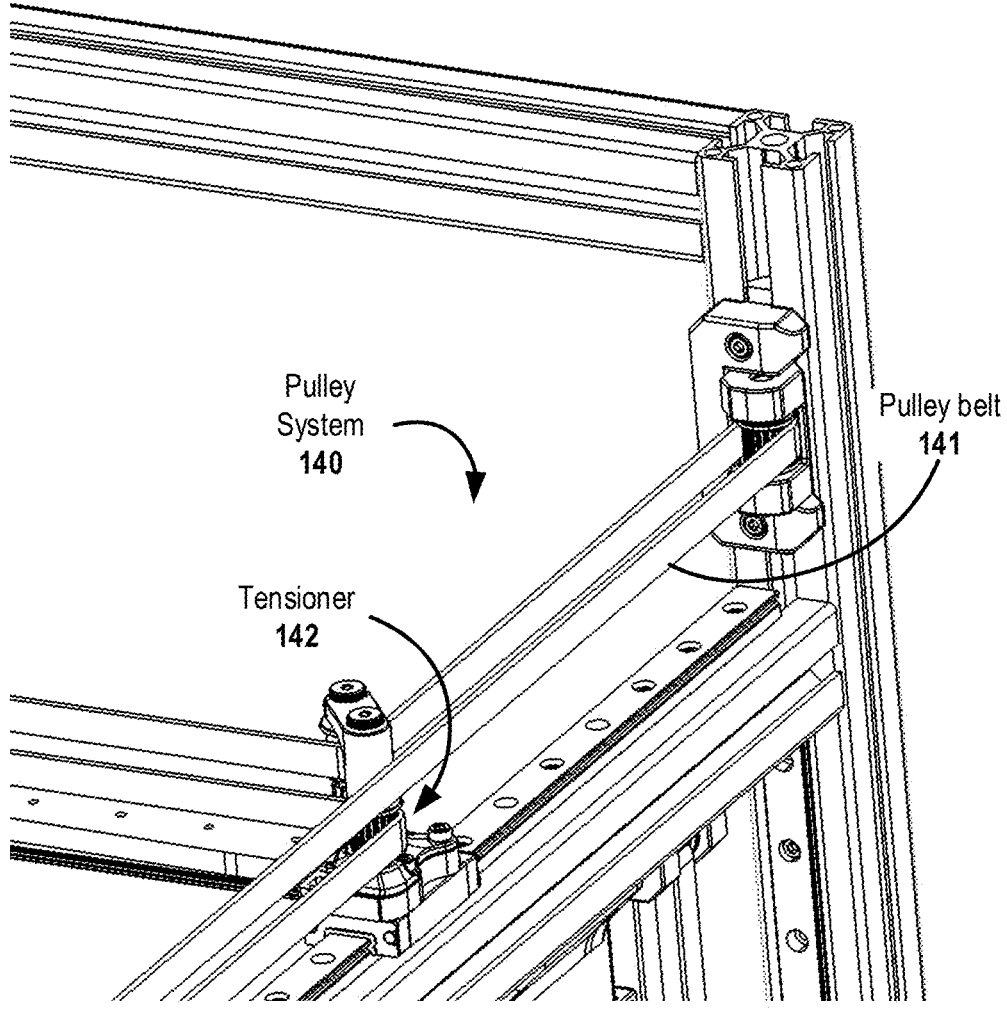
FIG. 4 shows an exemplary partial-illustration of a pulley system.

FIG. 4 shows an exemplary partial-illustration of a linear drive system 140. The linear drive system 140 may comprise, consist of, or consist essentially of a means for translating the toolhead 130 along one of a plurality of linear rails. In one embodiment, the linear drive system 140 is a pulley system. In some embodiments, the linear drive system 140 may further comprise a plurality of pulley belts 141 and at least one tensioner 142 that facilitate translating the toolhead 130 in the X, Y, and Z directions within the print chamber. Typically, these rails are an X-linear rail 142, Y-linear rail 141, and a Z-linear rail. These rails enable the printing of a 3D dimensional print object minimum possible threshold between print area (defined in the X and Y directions by the print plate 111). As shown in FIG. 3, the belts of the linear drive system 140 run directly adjacent to the outer enclosure 120 with a minimal gap. This minimal gap, combined with the other features described herein, contribute to the compact nature and volumetric efficiency of this disclosure. In some embodiments, the linear drive system 140 comprising belts fits within the outer enclosure recesses. Furthermore, the tensioners 142 are designed for multi-functional purposes that space and create a compact overall design. For example, as seen in FIG. 4, the tensioner 142 is designed to adjust the tension on both of the plurality of pulley belts 141.

Figure 5:
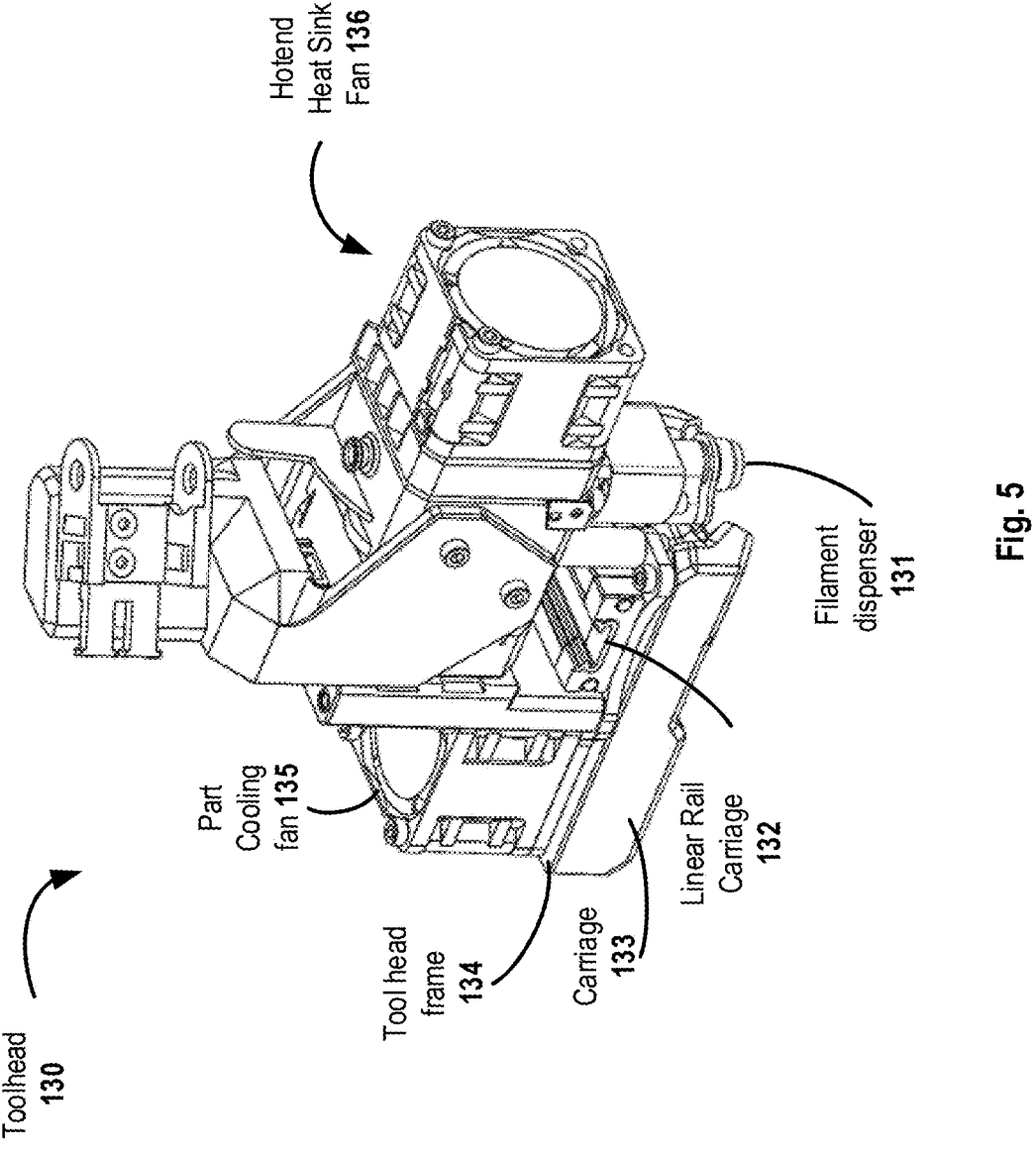
FIG. 5 shows an exemplary illustration of an isometric view of an additive manufacturing system's toolhead.

FIG. 5 shows an exemplary illustration of an isometric view of an additive manufacturing system's toolhead 130 comprising, consisting of, or consisting essentially of a filament dispenser 131, linear rail carriage 132, carriage 133, tool head frame 134, part cooling fan 135, and hotend heat sink fan 136. The Toolhead 130 may traverse the X, Y, and Z axes and dispense build material to build a 3D printable structure. As discussed previously, the filament dispenser 131 dispenses build material at a wide range of rates that is related to the nozzle's volume flowrate and the dispenser's feed rate. The arrangement of the toolhead's 130 components are intentionally designed to maximize volumetric efficiency.

Maximizing volumetric efficiency is accomplished by arranging the toolhead's 130 components to take advantage of empty space within the print chamber 110. For example, the part cooling fan 135 extends towards the rear of the enclosed additive manufacturing system 100 and, when in its rearmost position, to extend into the empty cavity above the filament spool, as illustrated by FIG. 3. Furthermore, this unique structure is enabled by a custom designed toolhead frame 134. Each component is oriented to extend perpendicularly from the X-linear rail to take advantage of free space. Additionally, the toolhead 130 is transected by the linear rail carriage 132, which creates a toolhead 130 that, in essence, wraps around the linear rail carriage 132. By wrapping the toolhead 130 around the linear rail carriage 132 and arranging the components perpendicular to the X-linear rail, the space required for the toolhead is minimized in the printer chamber 110.

In one embodiment, the toolhead frame 134 is coupled to the underside of the linear rail carriage 132, the carriage 133 is coupled to the underside of the tool head frame 134, the part cooling fan 135 is coupled to the topside of the toolhead frame 134 and arranged on the rear-end, the filament dispense 131 is coupled to the topside of the toolhead frame 134 and arranged near the front-end, and the hotend heat sink fan 136 is coupled to the filament dispenser 131 and extends from the front end of the toolhead 130, wherein the toolhead has a slim and narrow design.

Figure 6:
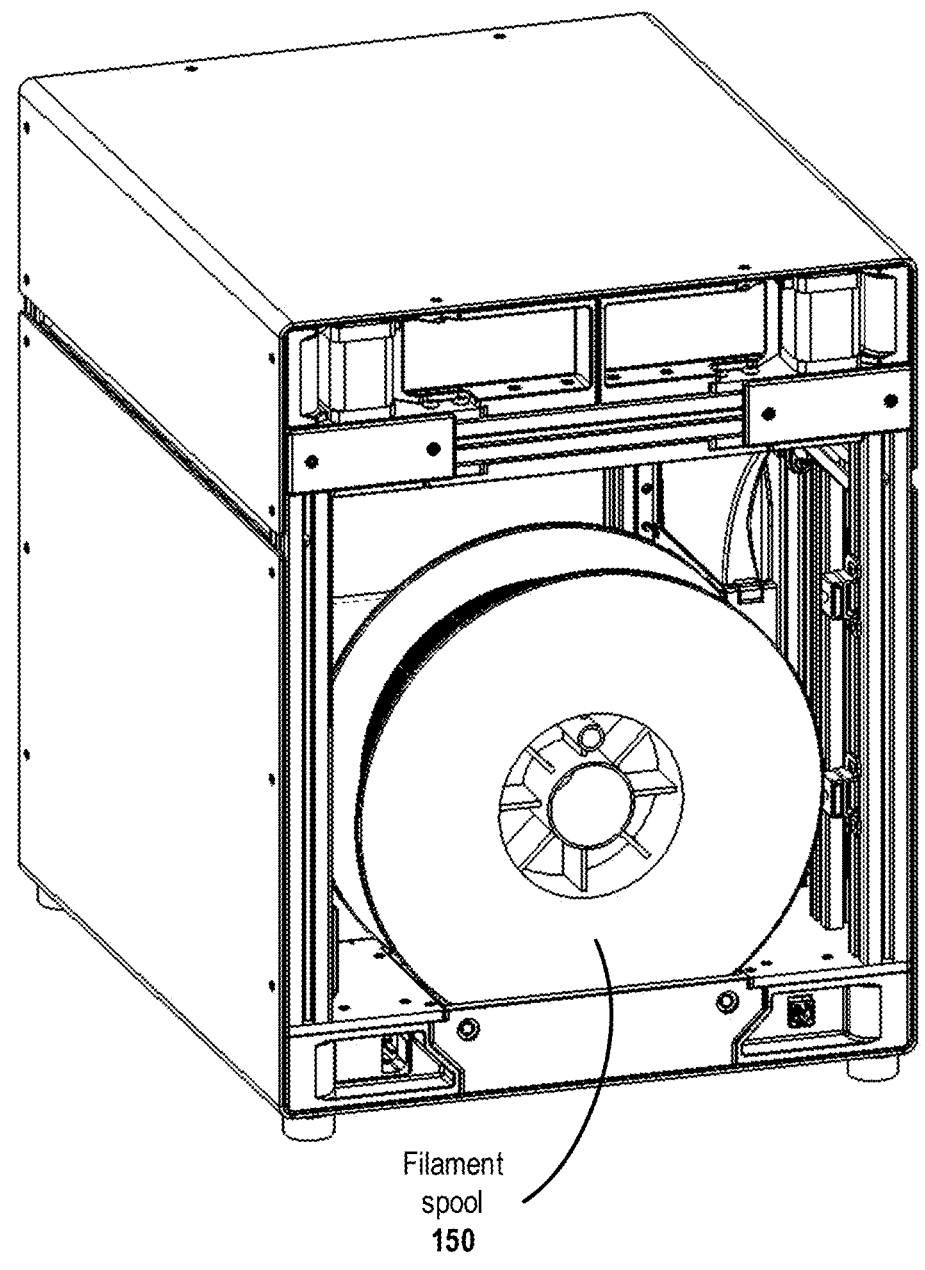
FIG. 6 shows an exemplary illustration of a rear-view of an additive manufacturing system.

FIG. 6 shows an exemplary illustration of a rear-view of an additive manufacturing system comprising, consisting of, or consisting essentially of a filament spool 150 in the lower-rear of the printer. This position of the spool offers many benefits, including lowering the center of gravity and ease of access from a back-access panel. The filament spool may be a variety of sizes, including a standard size of a one-kilogram filament spool, a two-kilogram filament roll, and, uniquely, up to a four-kilogram filament spool. Allotting sufficient space for a four-kilogram spool is unique, especially inside the enclosed printer and allows for printing substantially more printable objects. In some embodiments, the filament spool 150 may be located in the lower-rear-middle of the printer chamber 110, as shown in FIG. 5. In other embodiments, the filament spool 150 may be located in other areas inside the printer chamber 110.

Figure 7:
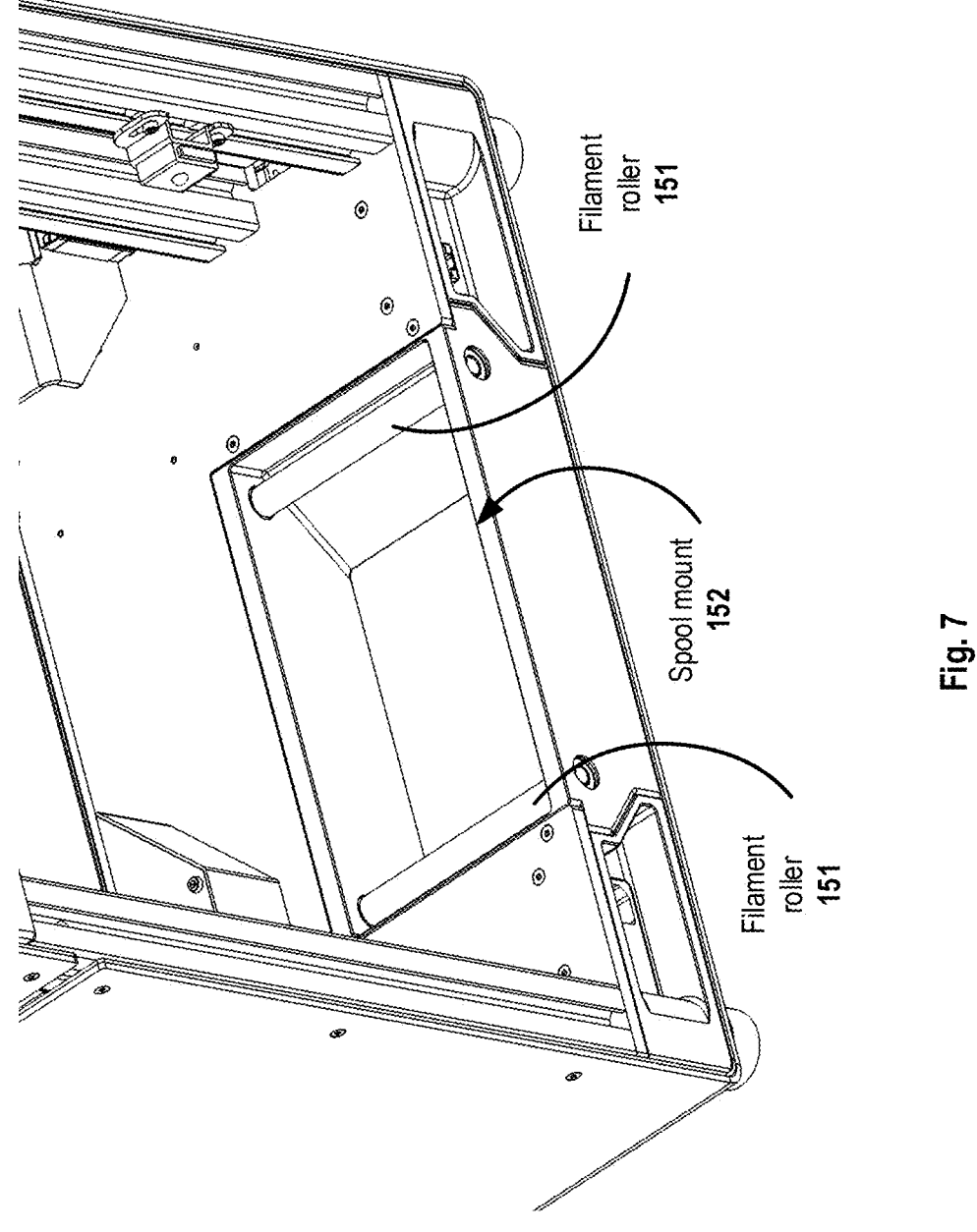
FIG. 7 shows an exemplary illustration of a lower rear-view of an additive manufacturing system.

FIG. 7 shows an exemplary lower rear-view illustration of an additive manufacturing system comprising at least one filament roller 151 and spool mount 152. The at least one filament roller 151 enables the unwinding of the filament spool. In some embodiments, the at least one filament rollers 151 are passive. In some embodiments, the at least one filament rollers 151 are active or motorized and capable of turning the spool to feed the filament dispenser 112. The spool mount 152 is sized to facilitate a variety of spool sizes including the one-kilogram, two-kilogram, and four kilogram spools, as discussed above. The enclosed additive manufacturing system or apparatus 100 may further comprise a strain gauge configured to weigh the filament spool 150. The weight of the filament spool 150 may provide relevant information for determining the amount of filament or build material currently on the spool 150.

Print speed is an important consideration for AM devices, as it is determinative of its output rate. In one embodiment, the AMOS may comprise a filament dispense that may dispense the build material from 250 millimeters per second to 500 millimeters per second and acceleration 20k millimeters per second squared. Determinative aspects of the rate of filament dispensing (i.e. extruding) may include using a plurality of extruders, direct drive extruders, nozzle size, cooling systems, and high torque motors. These design considerations may improve printing time without sacrificing precision or quality. Furthermore, a variety of filament speeds and accelerations may be utilizes by the subject matter of this disclosure. The print speed relates to the acceleration via the torque-speed curves of the stepper motor. A person skilled in the art may make an appropriate selection based on the use criteria.

Figure 8:
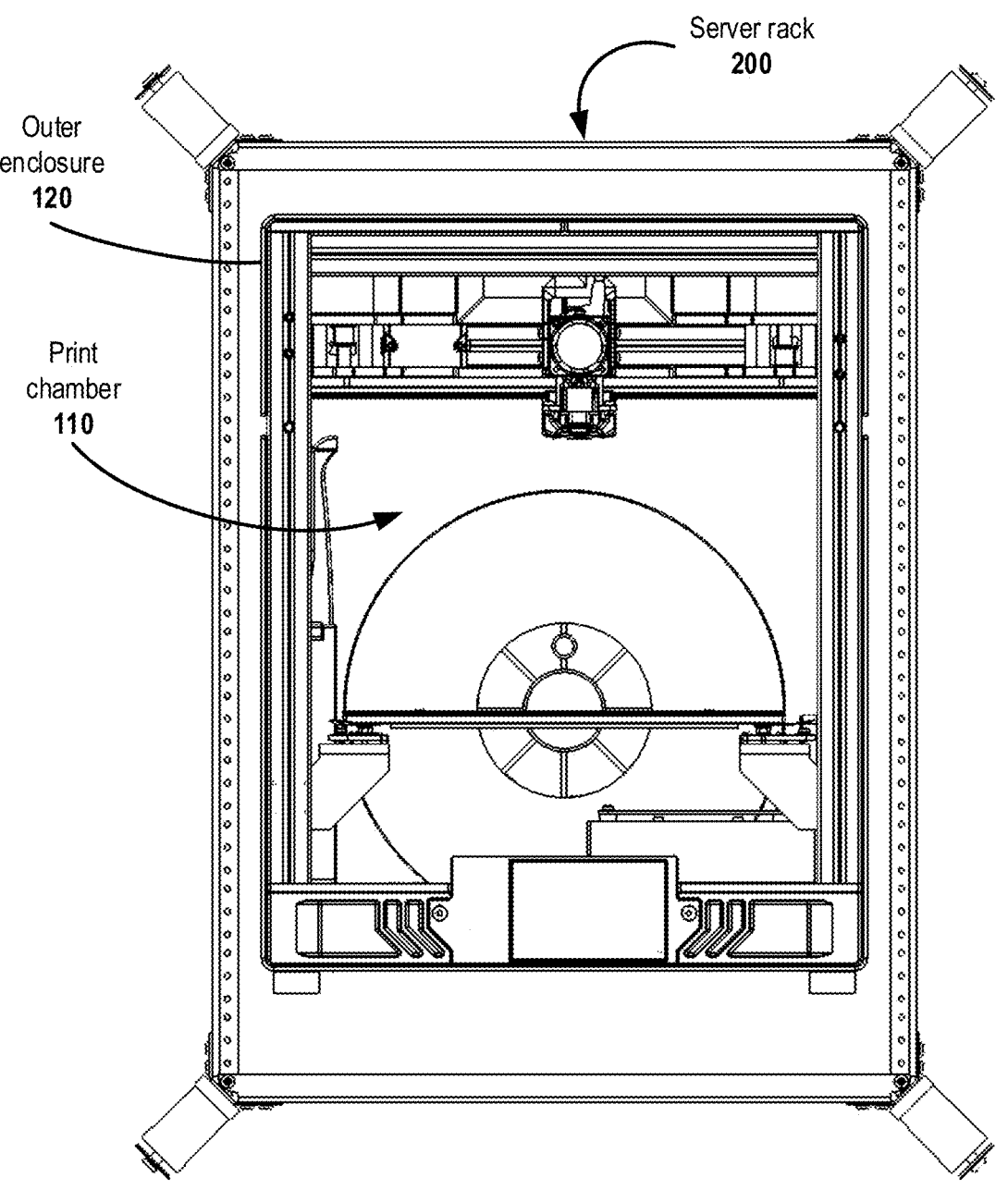
FIG. 8 shows an exemplary front-view illustration of an additive manufacturing system.

FIG. 8 shows an exemplary front-view illustration of an additive manufacturing system comprising a print chamber 110, outer enclosure 120, and server rack 200. In some embodiments, the server rack 200 may be a commercial-off-the-shelf rack. For example, a standard width of such exemplary server racks 200 is 17 ¾ inches wide with an approximate shelf width of 16 ¼ inches. It is desirable to optimize the print volume efficiency of the shelf to maximize the size of the printable objects from the AM devices including 3D printers. In some embodiment, the AMOS achieves an approximate width of 16 ¼ inches while also containing a 12 inch by 12 inch print plate 111. In some embodiments, a plurality of enclosed additive manufacturing system devices could be arranged in as a network into an array of additive manufacturing devices 100. In these circumstances, the plurality of enclosed additive manufacturing system devices could all be mounted to server racks 200.

As discussed previously, print volume efficiency is an important consideration for compact environments. The greater the print volume efficiency, the larger print possibilities exist for a given space. For example, a space constrained by the width of a server rack. Additionally, a greater volume efficiency enables a more portable, easy to transport, and efficiency device/system. In one embodiment, the volumetric efficiency of a print volume to three-dimensional printer volume may meets or exceeds 30 percent.

FIG. 9 shows a table 90 comprising three embodiments of 3D printers and displays a comparison of their corresponding volumetric efficiency. As shown, a high volumetric efficiency is enabled by this disclosure across classes of printer size. 3D printers are characterized by class because different sizes are relevant for diverse use cases. A high volumetric efficiency is important benefit for all classes. Even if the relative volumetric volume is lower as a percentage, it must be compared within its class. This disclosure provides an apparatus, system, and method that maximizes volumetric efficiency for all of these classes. Consequently, volumetric efficiency is not just important to consider overall, but as relative to the size of the printer.

FIG. 10 shows a block-diagram flowchart 1000 of a method of three-dimensional printing using an enclosed additive manufacturing system comprising a method of additive manufacturing, the steps comprising: providing an enclosed additive manufacturing system comprising an outer enclosure; and a print chamber within the outer enclosure, further comprising a spool mount fixed proximally to a bottom of the print chamber and a rear of the print chamber, a compact toolhead coupled to a linear rail, and further comprising an extruder motor, a filament applicator, and a linear motor, wherein the linear motor is mounted towards the rear of the print chamber and may be selectively positioned above the spool mount, a linear drive system abutting the outer enclosure along at least one axis, a frame structure comprising a rigid base plate coupled to a vertical pulley system, a controller, and a non-transitory storage medium capable of storing machine-readable instructions executable to cause the controller to utilize the filament applicator to dispense a build material; heating the print chamber with heat radiated from the filament dispenser; receiving instructions to build a three-dimensional object; and printing the three-dimensional object within the print chamber of the enclosed additive manufacturing system.

The design and layouts of this disclosure may be used for FFF, FDM, and other methods of component fabrication outside of FFF/FDM. The motion system and print plate design by be modified to enable the desktop production of electrical Printer Circuit Board ("PCB") components and assemblies at scale. Toolhead changing may be integrated into AMOS enabling synchronous additive and subtractive manufacturing processes. A leaser toolhead may also be installed to enable the engraving of parts and assemblies.

In some embodiment, the AMOS may further comprise the properties or characteristics as follow. A build volume of 300 mm×300 mm×220 mm a printer size of 418 mm×510 mm×548 mm. The power requirements may be 500 W Avg. and 1000 W Peak with a voltage of 110 V. A nozzle size may be about 0.6 mm. A maximum hotend temperature may be 500 degrees Celsius, the maximum bed temperature may be 120 degrees Celsius, and the maximum chamber temperature may be 90 degrees Celsius with an active chamber. A layer resolution of 0.05~0.40 mm. A plurality of fans each capable of blowing more than 30 cubic feet a minute.

The ecosystem of the AMOS may further include a Direct Drive Bondtech LGC Ace w/ Slice Magnum+100 W Heater (toolhead), Klipper (Firmware), Z Probe (Beacon), and 4 KG Filament Storage for Material Conditioning (Chamber).

From the above description of an Advanced Manufacturing Operational Apparatus, System, and Method, it is manifest that various techniques may be used for implementing the concepts of an Advanced Manufacturing Operational Apparatus, System, and Method without departing from the scope of the claims. The described embodiments are to be considered in all respects as illustrative and not restrictive. The apparatus, system, and method disclosed herein may be practiced in the absence of any element that is not specifically claimed and/or disclosed herein. It should also be understood that an Advanced Manufacturing Operational Apparatus, System, and Method are not limited to the particular embodiments described herein, but is capable of many embodiments without departing from the scope of the claims.

What is claimed:

1. An enclosed three-dimensional printer, comprising: an outer enclosure; and
  a print chamber within the outer enclosure, further comprising:
    a spool mount fixed proximally to a bottom of the print chamber and a rear of the print chamber,
    a compact toolhead coupled to a linear rail, and further comprising an extruder motor, a filament applicator, and a linear motor, wherein the linear motor is mounted towards the rear of the print chamber and may be selectively positioned above the spool mount,
    a linear drive system abutting the outer enclosure along at least one axis,
    a frame structure comprising a rigid base plate coupled to a vertical pulley system configured to translate the compact toolhead along a vertical axis within the print chamber,
    a controller, and
    a non-transitory storage medium capable of storing machine-readable instructions executable to cause the controller to:
    utilize the filament applicator to dispense a build material.

2. The enclosed three-dimensional printer of claim 1, wherein the outer enclosure is a ruggedized case.

3. The enclosed three-dimensional printer of claim 1, wherein the outer enclosure is designed to fit tightly within a commercial-off-the-shelf server rack.

4. A method of additive manufacturing, the steps comprising:

providing an enclosed additive manufacturing system comprising an outer enclosure; and
  a print chamber within the outer enclosure, further comprising a spool mount fixed proximally to a bottom of the print chamber and a rear of the print chamber,
  a compact toolhead coupled to a linear rail,
  and further comprising an extruder motor,
  a filament applicator,
  and a linear motor,
  wherein the linear motor is mounted towards the rear of the print chamber and may be selectively positioned above the spool mount, a linear drive system abutting the outer enclosure along at least one axis,
    a frame structure comprising a rigid base plate coupled to a vertical pulley system configured to translate the compact toolhead along a vertical axis within the print chamber,
    a controller, a non-transitory storage medium capable of storing machine-readable instructions executable to cause the controller to utilize the filament applicator to dispense a build material;
    heating the print chamber with heat radiated from the filament dispenser;
    receiving instructions to build a three-dimensional object; and
    printing the three-dimensional object within the print chamber of the enclosed additive manufacturing system.

5. The method of additive manufacturing of claim 4, wherein the outer enclosure is a ruggedized case.

6. The method of additive manufacturing of claim 4, wherein the outer enclosure is designed to fit tightly within a commercial-off-the-shelf server rack.

7. A rack mountable additive manufacturing system, comprising:
  an outer enclosure capable of mounting to a server rack; and
  a print chamber within the outer enclosure designed to maximize volumetric efficiency, further comprising:
  a spool mount fixed proximally to a bottom of the print chamber and a rear of the print chamber,
  a compact toolhead coupled to a linear rail, and further comprising an extruder motor, a filament applicator, and a linear motor, wherein the linear motor is mounted towards the rear of the print chamber and may be selectively positioned above the spool mount,
  a linear drive system abutting the outer enclosure along at least one axis,
  a frame structure comprising a rigid base plate coupled to a vertical pulley system configured to translate the compact toolhead along a vertical axis within the print chamber,
  a controller, and
  a non-transitory storage medium capable of storing machine-readable instructions executable to cause the controller to:
  utilize the filament applicator to dispense a build material.

8. The rack mountable additive manufacturing system of claim 7, wherein the outer enclosure is a ruggedized case.

9. The rack mountable additive manufacturing system of claim 7, further comprising: a control system configured to manage additive manufacturing processes.

* * * * *